Oct. 21, 1952 — W. F. ARDUSSI — 2,614,608
SEAT SUPPORTING STRUCTURE
Filed April 1, 1947
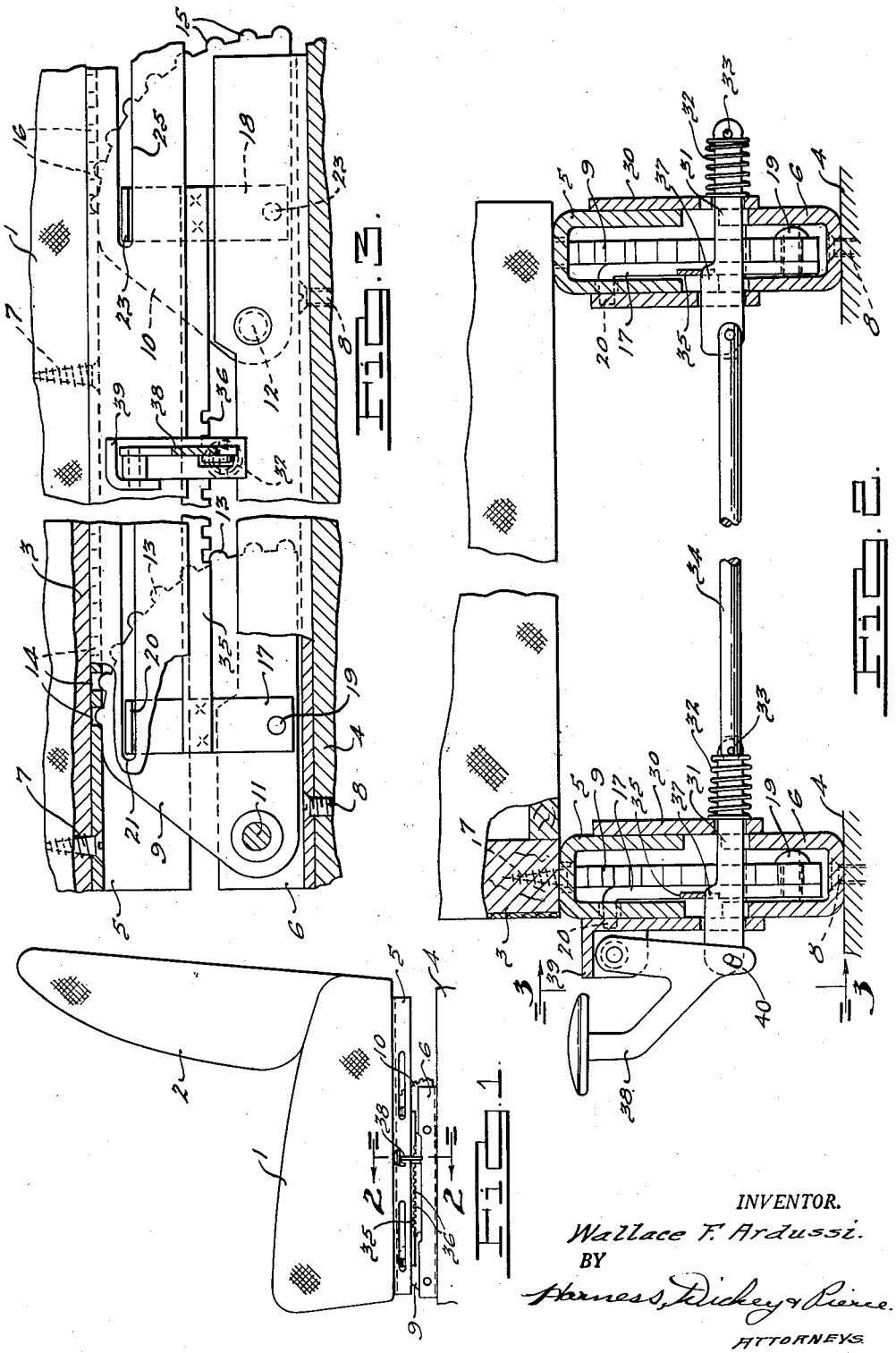
INVENTOR.
Wallace F. Ardussi.
BY
Harness, Dickey & Pierce.
ATTORNEYS.

Patented Oct. 21, 1952

2,614,608

UNITED STATES PATENT OFFICE 2,614,608

SEAT SUPPORTING STRUCTURE

Wallace F. Ardussi, Rocky River, Ohio, assignor to Hupp Corporation, formerly Hupp Motor Car Corporation, Detroit, Mich., a corporation of Virginia Application April 1, 1947, Serial No. 738,525

4 Claims. (Cl. 155—14)

The present invention relates generally to seat supporting structures and more particularly to adjustable seat supporting structures of the type generally used in present day automotive vehicles.

As is well recognized, it is desirable to provide means for adjusting the driver's seat of an automobile with respect to the steering wheel, pedals, etc., in order that each individual driver of the vehicle may make such adjustments as may be necessary to position the seat in such manner as to best suit his own requirements.

It is, therefore, a primary object of the present invention, to provide a simple, easily adjusted, seat supporting structure which may easily and conveniently be adjusted by the driver while seated in the seat.

Still further, the invention contemplates the provision of a seat supporting construction which is so constructed that when the seat is moved forwardly toward the steering wheel and pedals, the seat is automatically elevated a predetermined amount for each increment of forward movement. This is regarded as a particularly desirable feature in constructions of this general character because persons of small stature usually prefer to sit not only closer to the steering wheel, but also in a more elevated position with respect to the windshield.

Yet another important object of the present invention consists in the provision of a seat supporting structure which is not only cheap and easy to manufacture but which also is relatively free from rattles and many of the other disadvantages common to the seat supporting constructions presently employed.

Further, the invention contemplates the provision of a seat supporting construction in which novel and improved means are provided not only for adjusting the seat slide but also for positively locking the seat in the predetermined desired adjusted position.

Many other and further objects, advantages and features of the present invention will become clearly apparent from the following specification when considered in connection with the accompanying drawings forming a part thereof.

In the drawings:

Figure 1 is a side elevational view of a seat construction for an automobile illustrating the same mounted on a seat supporting mechanism embodying the improvements of the present invention.

Figure 2 is an enlarged fragmentary sectional view taken substantially along the line 2—2 of Figure 1 illustrating the general construction and arrangement of parts of the seat supporting construction shown in Figure 1 of the drawings showing in particular detail the means employed for locking the seat slide in predetermined adjusted position.

Figure 3 is a fragmentary elevational view with parts broken away and parts in section taken substantially along the line 3—3 of Figure 2 illustrating in still further detail the general construction and arrangement of parts of one portion of the improved seat supporting construction.

While it will be readily appreciated that many and various modifications may be made in the specific construction shown without departing from the generic spirit and scope of the present invention as set forth in the claims, the single embodiment illustrated in the drawings shows one form of the improved construction which is particularly simple and easy to manufacture.

In the construction specifically illustrated in the drawings a substantially conventional seat is provided which comprises a seat cushion 1 on which is mounted a seat back 2 which as shown may be rigidly connected to the frame of the seat cushion or may if desired be hingedly connected thereto as is often desirable in some constructions.

The seat cushion 1 and the associated seat back 2 is mounted on a relatively rigid generally rectangular frame 3, fragmentary portions of which are shown in Figures 2 and 3.

The specific seat supporting construction shown comprises a pair of assemblies, one located at each of the lateral sides of the seat which serve to adjustably mount the seat with respect to the floor 4 of the vehicle in which the seat is mounted. Each of these assemblies is substantially identical in construction and comprises a pair of facing channel sections. In the assembly illustrated in the left hand portion of Figure 2, it will be seen that this assembly comprises an upper rail member 5 and a lower rail 6. Each of these rail members is formed of generally channel-shaped cross section, and it will be seen that the upper rail member 5 may be securely anchored to the seat frame 3 by means of screws 7 extending through the base of the channel. Similarly, the lower rail member is anchored to the floor 4 of the vehicle body by means of screws 8.

In order to interconnect the upper and lower rail members 5 and 6, a pair of elevating cams 9 and 10 are provided. The cam 9 is mounted for rotation about a pivot pin 11 anchored in the side wall of the channel-shaped rail member 6 and the elevating cam 10 is mounted for rotation about a similar pivot pin 12. The elevating cam 9 has throughout a portion of its peripheral surface a series of teeth 13 which lie along an arc of a circle. The arc of the circle along which these teeth lie has its center considerably offset from the pivot pin 11, thus providing an arcuately surfaced cam member in which the arcuate surface thereof is eccentric to the pivot point about which the cam rotates. The base portion of the channel member 5 is provided with a series of apertures 14 spaced in the same manner as the teeth 13 which provide a rack with which the gear teeth 13 are adapted to mesh.

The elevating cam 10 is substantially the same size, shape and configuration as the cam 9, and is provided on its arcuate eccentric periphery with a series of teeth 15 similar to the teeth 13 adapted to mesh with a corresponding series of apertures 16 formed in the base of the channel member 5, these apertures being similar in construction and function to the apertures 14 described above.

As will hereinafter be more clear, the seat supporting construction herein described contemplates a construction in which upper and lower channel members may be moved relative to each other and yet at the same time constantly retain their parallel relationship. Likewise, it will be readily appreciated that the magnitude of the offset of the center of the arc from the pivot pin will determine the extent to which the seat is elevated during the forward movement of the seat.

It is regarded as important that the upper rail 5 of the seat slide and the lower rail 6 thereof be maintained in parallel relation throughout all positions in their operative range and at the same time to provide means for maintaining the seat slide in assembled relation at all times. In the embodiment of the invention shown in the drawings, these results are accomplished by means of anchor members 17 and 18 respectively associated with the elevating cams 9 and 10. The anchor member 17 is pivotally connected to the elevating cam 9 by means of a pivot pin 19. The pivot pin 19 is located at a point which coincides with the center of the arc of the circle in which the teeth 13 lie. The upper end of the anchor member 17 has a laterally bent upper end 20 bent to lie at right angles to the body portion thereof. This portion 20 is adapted to extend through a slot 21 formed in the side wall of the channel member 5 and lie longitudinally therein in a direction parallel to the base of the channel member 5. This slot is of a length sufficient to take care of all the longitudinal movement which may be required between the upper and lower rail members 5 and 6.

Similarly, the rear elevating cam 10 has associated therewith an anchor member 18 which is pivotally mounted by means of a pivot pin 23. This anchor has a similarly laterally bent upper end portion 24 extending through a slot 25 which corresponds with the slot 21 described above.

From the foregoing, it will be readily seen that as the seat frame is moved forwardly with respect to the floor of the vehicle in which the seat is mounted, the seat frame will correspondingly be elevated. Likewise, it will be appreciated that by selecting various desired radii about which the teeth of the elevating cams are positioned and by varying the magnitude of the offset of the center of this arc from the pivot point of the elevating cam various magnitudes of relative movements may be obtained. In any event, it will be seen that at all times and in all positions the anchor members will not only serve to retain the upper and lower members in parallel relation but also to maintain the seat slide construction in assembled conditions and prevent separation of the parts.

It is also desirable to provide means common to both seat supporting slides for simultaneously locking the same in predetermined adjusted position. The upper channel member 5 of each of the seat slides has on one side thereof a bracket 30 rigidly secured to one of the side walls thereof and extending downwardly therefrom. Each of these brackets has an aperture in its lower end through which a locking key 31 is adapted to pass. Each of the locking keys 31 has a compression coil spring 32 surrounding the same held in position by means of a pin 33. The locking keys are interconnected for simultaneous movement by means of a link 34 connecting the same.

A pair of locking strips 35 are provided. Each of these locking strips is associated with one of the seat slides. These locking strips have downwardly directed teeth 36 on the lower edges thereof and each of these strips is welded at each of its ends in overlapping relationship to the anchor members. In other words, each of the locking strips 35 has one end thereof welded to one of the anchor members 17 and at its opposite end welded to the anchor member 18. These strips obviously serve to maintain the anchor members in parallel relation at all times.

Latching and unlatching of this mechanism is accomplished by means of a conveniently located operating handle 38 which in the particular construction shown is mounted for pivotal movement on a suitable bracket 39. The operating handle 38 has one arm 40 projecting therefrom which is pivotally connected by a suitable lost motion connection to the protruding end of one of the locking keys 31 in such a manner that when the handle 38 is pulled upwardly both of the locking keys will be moved laterally thereby disengaging the portions 37 thereof from the notches 36. While these keys are disengaged from the notches, it will be clear from the construction described above that the seat construction can easily and conveniently be moved to any desired adjusted position. Upon release of the handle 38 it will be seen that the springs 32 will move the locking keys 31 to the right as viewed in Figure 3 of the drawings thereby forcing the projections 37 into one of the notches 36.

Many other and various equally effective modifications of the specific construction herein disclosed will become clearly apparent to those skilled in the art.

I claim:

1. A seat supporting structure including in combination, a channel shaped supporting rail adapted to be anchored to the floor of an automobile, a channel shaped upper rail adapted to be anchored to the supporting frame of an automobile seat, a pair of cams each pivotally connected to said lower rail member and having their peripheral cam surfaces engaging said upper rail member, said upper rail member being provided with a pair of slots in the side wall thereof parallel to the base of the channel thereof, a pair of L-shaped members one pivotally anchored to each of said cams, said L-shaped members having the upper ends thereof entering said slots to retain said upper and lower members in parallel relationship during relative shifting movement, a latch bar fixed to and rigidly interconnecting said L-shaped members, and a latch member carried by said upper member adapted to engage said latch bar and retain said members in predetermined adjusted position.

2. A seat supporting structure for use in automotive vehicles including in combination a supporting rail adapted to be anchored to the floor of an automotive vehicle, a downwardly facing channel-shaped upper rail member adapted to be anchored to the supporting frame of an automobile seat, a pair of cam members pivotally connected to said lower supporting rail and having their peripheral surfaces engaging said upper rail member, said upper rail member being provided with a pair of slots in the side walls of the channel parallel to the base of the channel, a pair of L-shaped keeper elements, one pivotally mounted to each of said cams, said elements having the upper ends thereof entering said slots to retain said upper and lower members in parallel relationship during relative shifting movement and a bar rigidly connecting said L-shaped keeper elements to retain said keeper elements in parallel relationship to each other at all times.

3. A seat supporting structure for use in automotive vehicles including in combination a supporting rail adapted to be anchored to the floor of an automotive vehicle, a downwardly facing channel-shaped upper rail member adapted to be anchored to the supporting frame of an automobile seat, a pair of cam members pivotally connected to said lower supporting rail and having their peripheral surfaces engaging said upper rail member, said upper rail member being provided with a pair of slots in the side walls of the channel parallel to the base of the channel, a pair of L-shaped keeper elements, one pivotally mounted to each of said cams, said elements having the upper ends thereof entering said slots to retain said upper and lower members in parallel relationship during relative shifting movement, a latch bar fixed to and rigidly interconnecting said L-shaped keeper elements, and a latch member carried by said upper rail member adapted to engage said latch bar and retain said upper and lower members in predetermined adjusted relation.

4. A seat supporting structure for use in automotive vehicles including in combination a lower rail member adapted to be anchored to the floor of an automobile body, a channel-shaped upper rail member having downwardly depending side walls, the base of the channel of said upper rail member adapted to be anchored to the supporting frame of an automobile seat, a pair of rotatable cam elements each pivotally connected to said lower rail member and having toothed peripheral surfaces, said upper channel member being provided with spaced apertures in the base thereof adapted to receive the teeth on the periphery of said cam elements whereby said cam elements will serve to support and move said upper rail element relative to said lower supporting rail, said upper rail member being provided with a pair of slots in the side walls thereof parallel to the base of the channel element, a pair of L-shaped members one pivotally anchored to each of said rotatable cam elements, said L-shaped members each having the laterally extending upper end thereof entering one of said slots to retain said upper and lower members in parallel relationship during relative shifting movement, a latch bar fixed to and rigidly interconnecting said L-shaped members and a latch member carried by said upper rail element adapted to engage said latch bar and retain said members in predetermined adjusted relationship.

WALLACE F. ARDUSSI.

REFERENCES CITED

The following references are of record in the file of this patent:

UNITED STATES PATENTS

| Number | Name | Date |
| --- | --- | --- |
| 2,088,784 | Galamb et al. | Aug. 3, 1937 |
| 2,170,923 | Jacobs | Aug. 29, 1939 |
| 2,185,301 | Jacobs | Jan. 2, 1940 |
| 2,286,946 | Ball | June 16, 1942 |